US012127983B2

(12) United States Patent
Hynes et al.

(10) Patent No.: US 12,127,983 B2
(45) **Date of Patent: *Oct. 29, 2024**

(54) SHOULDER HOLD DOWN AND LOCKING MECHANISM THEREFOR FOR USE WITH A SURGICAL FRAME

(71) Applicant: Warsaw Orthopedic, Inc., Warsaw, IN (US)

(72) Inventors: Richard A. Hynes, Melbourne Beach, FL (US); Roy K. Lim, Memphis, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,889

(22) Filed: Aug. 28, 2023

(65) Prior Publication Data

US 2023/0398030 A1 Dec. 14, 2023

Related U.S. Application Data

(63) Continuation of application No. 17/978,772, filed on Nov. 1, 2022, now Pat. No. 11,737,942, which is a (Continued)

(51) Int. Cl.
*A61G 13/00* (2006.01)
*A61G 13/12* (2006.01)

(52) U.S. Cl.
CPC ....... *A61G 13/1255* (2013.01); *A61G 13/129* (2013.01)

(58) Field of Classification Search
CPC .. A61G 13/12; A61G 13/1235; A61G 13/124; A61G 13/1245; A61G 13/125; A61G 13/1255; A61G 13/128; A61G 13/129; A61G 13/121; A61G 7/075; A61G 7/0755; A61G 7/109; A61G 7/1092; A61G 7/1094; A61G 7/1096; A61G 7/1098; A61G 2210/10; A47C 7/54; A47C 7/541; A47C 7/543; A47C 7/546; A61F 5/37;

(Continued)

(56) References Cited

U.S. PATENT DOCUMENTS 2,691,979 A 10/1954 Watson
3,046,072 A 7/1962 Douglas et al.

(Continued)

FOREIGN PATENT DOCUMENTS

KR 10-2014-0111006 9/2014
WO 2009155211 12/2009

(Continued)

OTHER PUBLICATIONS

International Search Report and Written Opinion dated Feb. 6, 2020 from corresponding International Application No. PCT/US2019/056915.

(Continued)

*Primary Examiner* — Adam Baker

(57) ABSTRACT

A shoulder hold-down is provided for use in securing at least a shoulder of a patient in position relative to a surgical frame. The shoulder hold-down includes a locking mechanism that is adjustable to afford positioning of a shoulder engaging portion for contacting the patient.

20 Claims, 9 Drawing Sheets

Related U.S. Application Data continuation of application No. 16/513,422, filed on Jul. 16, 2019, now Pat. No. 11,628,114.

(58) Field of Classification Search

CPC ................ A61F 5/3761; A61F 5/3769; Y10T 403/7105; Y10T 403/718; Y10T 403/7194; Y10T 403/595; F16B 7/048; F16B 7/0493

USPC ........................................................ 128/845

See application file for complete search history.

(56) References Cited

U.S. PATENT DOCUMENTS

| | | | |
|---|---|---|---|
| 4,029,089 A | 6/1977 | Mulhlland | |
| 4,487,523 A | 12/1984 | Monroe | |
| 4,915,101 A | 4/1990 | Cuccia | |
| 5,410,769 A | 5/1995 | Waterman | |
| 6,032,309 A | 3/2000 | Michelson | |
| 6,076,525 A | 6/2000 | Hoffman | |
| 6,182,662 B1 | 2/2001 | McGhee | |
| 6,260,220 B1 | 7/2001 | Lamb | |
| 6,277,069 B1 | 8/2001 | Gray | |
| 6,566,833 B2 | 5/2003 | Barlett | |
| 6,715,169 B2 | 4/2004 | Niederkrom | |
| 6,728,983 B2 | 5/2004 | Bartlett et al. | |
| 6,732,390 B2 | 5/2004 | Krywiczanin | |
| 6,895,617 B2 | 5/2005 | Zacharopoulos et al. | |
| 6,934,986 B2 | 8/2005 | Krywiczanin et al. | |
| 6,941,951 B2 | 9/2005 | Hubert et al. | |
| 7,219,379 B2 | 5/2007 | Krywiczanin et al. | |
| 7,472,440 B2 | 1/2009 | Bartlett et al. | |
| 8,286,283 B2 | 10/2012 | Copeland et al. | |
| 9,072,646 B2 | 7/2015 | Skripps et al. | |
| 9,522,078 B2 | 12/2016 | Pizzini | |
| 9,554,959 B2 | 1/2017 | Carn | |
| 9,937,006 B2 | 4/2018 | Skripps et al. | |
| 11,026,857 B2 | 6/2021 | Lim | |
| 11,737,942 B2 * | 8/2023 | Lim | A61G 13/1255 128/845 |
| 2002/0138905 A1 | 10/2002 | Barltett et al. | |
| 2002/0138906 A1 | 10/2002 | Barltett et al. | |
| 2003/0140419 A1 | 7/2003 | Barltett et al. | |
| 2003/0140420 A1 | 7/2003 | Niederkrom | |
| 2003/0145382 A1 | 8/2003 | Krywiczanin | |
| 2004/0010849 A1 | 1/2004 | Krywiczanin et al. | |
| 2004/0123388 A1 | 7/2004 | Coppens et al. | |
| 2006/0037141 A1 | 2/2006 | Krywiczanin et al. | |
| 2006/0162076 A1 | 7/2006 | Bartlett et al. | |
| 2008/0078031 A1 | 4/2008 | Weinstein et al. | |
| 2009/0013507 A1 | 1/2009 | Scott et al. | |
| 2012/0103344 A1 | 5/2012 | Hunter | |
| 2012/0144589 A1 | 6/2012 | Skripps et al. | |
| 2013/0312189 A1 | 11/2013 | Sarma et al. | |
| 2015/0272681 A1 | 10/2015 | Skripps et al. | |
| 2016/0151224 A1 | 6/2016 | Ferro et al. | |
| 2016/0193099 A1 | 7/2016 | Drake | |
| 2017/0049651 A1 | 2/2017 | Lim | |
| 2017/0049653 A1 | 2/2017 | Lim | |
| 2017/0112698 A1 | 4/2017 | Hight et al. | |
| 2018/0363596 A1 | 12/2018 | Lim et al. | |
| 2019/0000702 A1 | 1/2019 | Lim et al. | |
| 2019/0000707 A1 | 1/2019 | Lim et al. | |
| 2019/0046381 A1 | 2/2019 | Lim et al. | |
| 2019/0046383 A1 | 2/2019 | Lim et al. | |

FOREIGN PATENT DOCUMENTS

| | | |
|---|---|---|
| WO | 2013117632 | 8/2013 |
| WO | 2016086162 | 6/2016 |

OTHER PUBLICATIONS

International Search Report and Written Opinion dated Nov. 16, 2020 from corresponding International Application No. PCT/US2020/042116.

Extended European Search Report dated Dec. 9, 2022 from European Application No. EP19926143.9.

* cited by examiner

SHOULDER HOLD DOWN AND LOCKING MECHANISM THEREFOR FOR USE WITH A SURGICAL FRAME

The present application is a continuation of U.S. application Ser. No. 17/978,772, filed Nov. 1, 2022; which is a continuation of U.S. application Ser. No. 16/513,422, filed Jul. 16, 2019; all of which is incorporated by reference herein.

FIELD

The present technology is generally related to a shoulder hold-down and a locking mechanism therefor for use with a surgical frame.

BACKGROUND

Surgical frames have been used to position and reposition a patient during surgery. For example, surgical frames have been configured to manipulate the rotational position of the patient before, during, and even after surgery. Such surgical frames include support structures to facilitate the rotational movement of the patient. Typical support structures can include main beams supported at either ends thereof for rotational movement about axes of rotation extending along the lengths of the surgical frames. The main beams can be positioned and repositioned to afford various positions of a patient positioned thereon. To illustrate, the main beams can be rotated for positioning a patient in prone positions, lateral positions, and positions 45° between the prone and lateral positions. However, given the rotational movement of the main beams, there is a desire for one or more shoulder hold-downs used in securing a shoulder or shoulders of the patient in position during such rotation.

SUMMARY

The techniques of this disclosure generally relate to one or more shoulder hold-downs and/or locking mechanisms therefor used for securing the shoulder or shoulders of a patient in position to facilitate rotational positioning and repositioning of the patient using a surgical frame.

In one aspect, the present disclosure provides a locking mechanism including an arm portion including a first shaft portion, a second shaft portion, and a first flange portion, the arm portion including a first end, an opposite second end, and a mid-longitudinal axis extending through the first end and the second end, the first shaft portion including a channel extending from at least adjacent the first end to at least adjacent the second end along the mid-longitudinal axis, the channel receiving portions of the second shaft portion therein, the first shaft portion including a first exterior surface, the second shaft portion including a second exterior surface, the first shaft portion adjacent the first end of the arm portion including a first aperture on a first side of the channel, the first shaft portion adjacent the first end of the arm portion including a second aperture on a second side of the channel, and the second shaft portion adjacent the first end of the arm portion including a third aperture; a lever-spring portion having a handle portion, a spring portion, and a collar portion, the handle portion being fixedly attached to spring portion; the spring portion including a first side portion and a second side portion, the first side portion and the second side portion of the spring portion being spaced apart from one another, the first side portion of the spring portion including a fourth aperture and a fifth aperture formed thereon, and the second side portion of the spring portion including a sixth aperture and a seventh aperture formed thereon, the collar portion including a first side portion and a second side portion, the first side portion and the second side portion being spaced apart from one another, the first side portion including a first post portion and a eighth aperture, the second side portion including a second post portion and a ninth aperture, end portions of each of the first shaft portion and the second shaft portion adjacent the first end of the arm portion being received between the first side portion and the second side portion of the collar portion, and portions of the first side portion and the second side portion of the collar portion being received between the first side portion and the second side portion of the spring portion; a bracket portion and a second flange portion, the bracket portion including at least a first side portion and a second side portion, the first side portion and the second side portion of the bracket portion being spaced apart from one another, the second flange portion being positioned between the first side portion and the third side portion of the bracket portion, the first side portion of the bracket portion including a tenth aperture, and the second side portion of the bracket portion including an eleventh aperture, the first side portion and the second side portion of the spring portion being received between the first side portion and the second side portion of the bracket portion; and one of a first rod and a first fastener extending through the first aperture, the second aperture, the fourth aperture, the sixth aperture, the tenth aperture, and the eleventh aperture to attach the first shaft portion of the arm portion, the lever-spring portion, and the bracket portion to one another, one of a second rod and a second fastener extending through the first aperture, the second aperture, the third aperture, the eighth aperture, and the ninth aperture to attach the first shaft portion of the arm portion, the second shaft portion of the arm portion, and the collar portion to one another, and the first post portion being received in the fifth aperture and the second post portion being received in the sixth aperture to attach the spring portion and the collar portion to one another; where movement of the handle portion from an unactuated position to an actuated position causes pivotal movement of the first portion and the second portion of the spring portion about one of the first rod and the first fastener, and causes corresponding movement of the first post portion and the second post portion toward the mid-longitudinal axis of the arm portion that causes movement of the one of the second rod and the second fastener toward the one of the first rod and the first fastener, movement of the one of the second rod and the second fastener toward the one of the first rod and the first fastener causing the second shaft portion to move at least partially out of the channel in the first shaft portion to expand the first shaft portion and the second shaft portion relative to one another.

In another aspect, the disclosure provides a locking mechanism including an arm portion including a first shaft portion and a second shaft portion, the arm portion including a first end, an opposite second end, and a mid-longitudinal axis extending through the first end and the second end, the first shaft portion including a channel extending from at least adjacent the first end to at least adjacent the second end along the mid-longitudinal axis, the channel receiving portions of the second shaft portion therein, the first shaft portion including a first exterior surface, the second shaft portion including a second exterior surface, the first shaft portion adjacent the first end of the arm portion including a first aperture on a first side of the channel, the first shaft portion adjacent the first end of the arm portion including a second aperture on a second side of the channel, and the second shaft portion adjacent the first end of the arm portion including a third aperture; a lever-spring portion having a handle portion, a spring portion, and a collar portion, the handle portion being fixedly attached to spring portion; the spring portion including a first side portion and a second side portion, the first side portion and the second side portion of the spring portion being spaced apart from one another, the first side portion of the spring portion including a fourth aperture and a fifth aperture formed thereon, and the second side portion of the spring portion including a sixth aperture and a seventh aperture formed thereon, the collar portion including a first side portion and a second side portion, the first side portion and the second side portion being spaced apart from one another, the first side portion including a first post portion and a eighth aperture, the second side portion including a second post portion and a ninth aperture, end portions of each of the first shaft portion and the second shaft portion adjacent the first end of the arm portion being received between the first side portion and the second side portion of the collar portion, and portions of the first side portion and the second side portion of the collar portion being received between the first side portion and the second side portion of the spring portion; and one of a first rod and a first fastener extending through the first aperture, the second aperture, the fourth aperture, and the sixth aperture to attach the first shaft portion of the arm portion, the lever-spring portion, and the bracket portion to one another, one of a second rod and a second fastener extending through the first aperture, the second aperture, the third aperture, the eighth aperture, and the ninth aperture to attach the first shaft portion of the arm portion, the second shaft portion of the arm portion, and the collar portion to one another, and the first post portion being received in the fifth aperture and the second post portion being received in the sixth aperture to attach the spring portion and the collar portion to one another; where movement of the handle portion from an unactuated position to an actuated position causes pivotal movement of the first portion and the second portion of the spring portion about one of the first rod and the first fastener, and causes corresponding movement of the first post portion and the second post portion toward the mid-longitudinal axis of the arm portion that causes movement of the one of the second rod and the second fastener toward the one of the first rod and the first fastener, movement of the one of the second rod and the second fastener toward the one of the first rod and the first fastener causing the second shaft portion to move at least partially out of the channel in the first shaft portion to expand the first shaft portion and the second shaft portion relative to one another.

In yet another aspect, the disclosure provides a locking mechanism including an arm portion including a first shaft portion and a second shaft portion, the arm portion including a first end, an opposite second end, and a mid-longitudinal axis extending through the first end and the second end, the first shaft portion including a channel extending from at least adjacent the first end to at least adjacent the second end along the mid-longitudinal axis, the channel receiving portions of the second shaft portion therein, the first shaft portion including a first exterior surface, the second shaft portion including a second exterior surface, the first shaft portion adjacent the first end of the arm portion including a first aperture on a first side of the channel, the first shaft portion adjacent the first end of the arm portion including a second aperture on a second side of the channel, and the second shaft portion adjacent the first end of the arm portion including a third aperture; a lever-spring portion having a handle portion, a spring portion, and a collar portion, the handle portion being fixedly attached to spring portion; the spring portion including a first side portion and a second side portion, the first side portion and the second side portion of the spring portion being spaced apart from one another, the first side portion of the spring portion including a fourth aperture and a fifth aperture formed thereon, and the second side portion of the spring portion including a sixth aperture and a seventh aperture formed thereon, the collar portion including a first side portion and a second side portion, the first side portion and the second side portion being spaced apart from one another, the first side portion including a first post portion and a eighth aperture, the second side portion including a second post portion and a ninth aperture, end portions of each of the first shaft portion and the second shaft portion adjacent the first end of the arm portion being received between the first side portion and the second side portion of the collar portion, and portions of the first side portion and the second side portion of the collar portion being received between the first side portion and the second side portion of the spring portion; and one of a first rod and a first fastener extending through the first aperture, the second aperture, the fourth aperture, and the sixth aperture to attach the first shaft portion of the arm portion, the lever-spring portion, and the bracket portion to one another, one of a second rod and a second fastener extending through the first aperture, the second aperture, the third aperture, the eighth aperture, and the ninth aperture to attach the first shaft portion of the arm portion, the second shaft portion of the arm portion, and the collar portion to one another, and the first post portion being received in the fifth aperture and the second post portion being received in the sixth aperture to attach the spring portion and the collar portion to one another; where movement of the handle portion from an unactuated position to an actuated position causes pivotal movement of the first portion and the second portion of the spring portion about one of the first rod and the first fastener, and causes corresponding movement of the first post portion and the second post portion toward the mid-longitudinal axis of the arm portion that causes movement of the one of the second rod and the second fastener toward the one of the first rod and the first fastener, movement of the one of the second rod and the second fastener toward the one of the first rod and the first fastener causing the second shaft portion to move at least partially out of the channel in the first shaft portion to expand the first shaft portion and the second shaft portion relative to one another; and where return movement of the handle portion from the actuated position to the unactuated position is resisted by flexion of portions of the spring portion.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
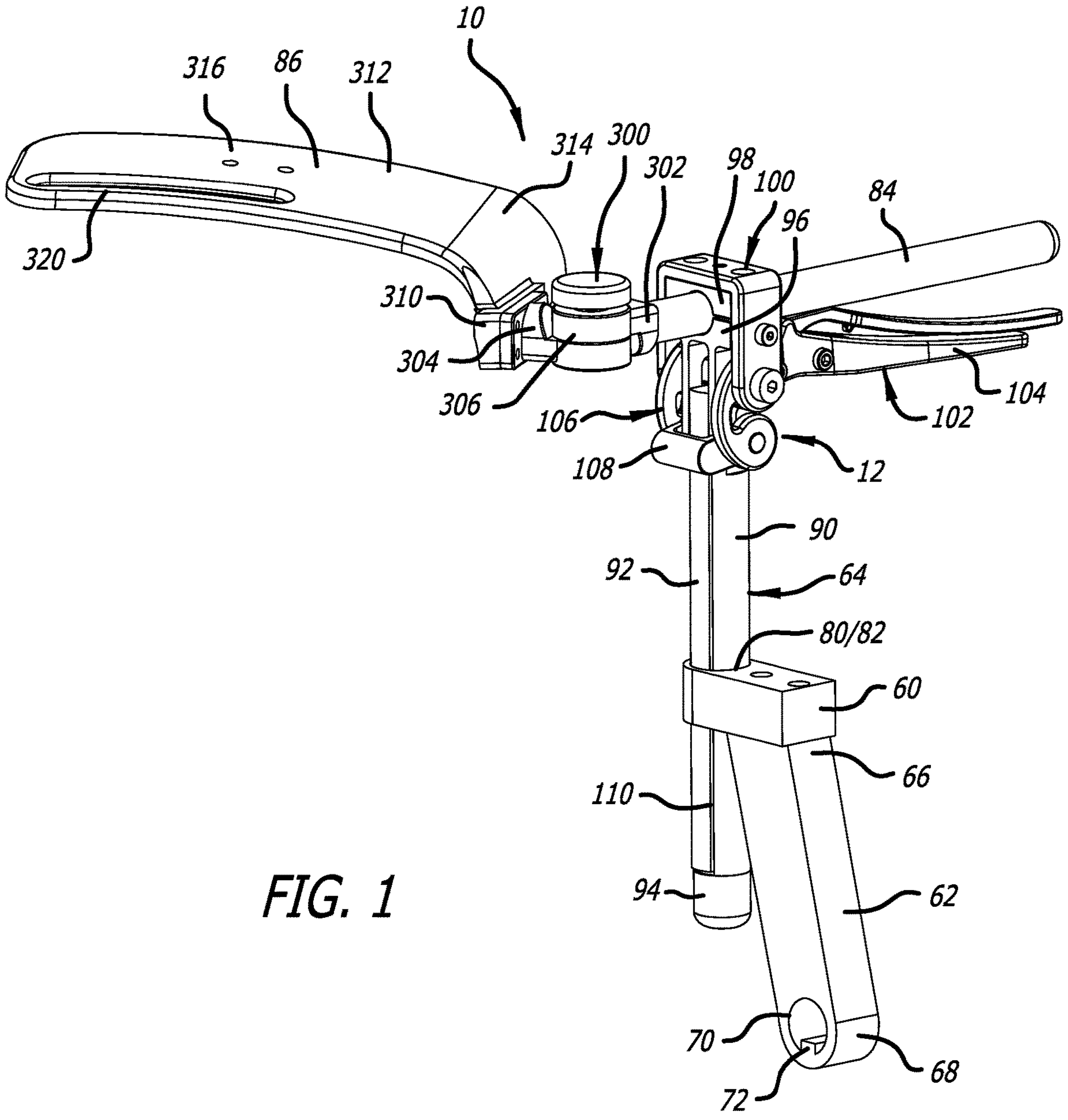
FIG. 1 is a side perspective view that illustrates an embodiment of a shoulder hold-down including a locking mechanism.

A shoulder hold-down according to a preferred embodiment of the present disclosure is generally indicated by the numeral 10 in FIG. 1. The shoulder hold-down 10 includes a locking mechanism 12 facilitating at least four (4) modes of adjustment and for locking the adjusted portions of each of the shoulder hold-downs 10 in position. The locking mechanism 12 is not limited to use with the shoulder hold-down 10, and can be used in other environments. The shoulder hold-down 10, as depicted in FIG. 1, can be used for holding the left shoulder of a patient and portions of the patient's back in position relative to a surgical frame (not shown); and another shoulder hold-down 10 can be used for holding the right should of the patient and portions of the patient's back in position relative to the surgical frame. The use of shoulder hold-downs for holding the position of a patient relative to a surgical frame is disclosed in U.S. application Ser. No. 16/395,821, which is hereby incorporated by reference in its entirety.

The shoulder hold-down 10 can be used with surgical frames such as that disclosed in U.S. application Ser. Nos. 15/239,256, 15/639,080 and 15/672,005, which are hereby incorporated by reference in their entireties.

As depicted in FIG. 1, the shoulder hold-down 10 includes a base portion 60, a leg portion 62 depending downwardly from the base portion 60, and an arm portion 64 moveable upwardly and downwardly with respect to the base portion 60. The leg portion 62 of the shoulder hold-down 10 includes a first end 66 and a second end 68. The leg portion 62 at the first end 66 is fixedly attached to the base portion 60 via fasteners (not shown) or other attachment mechanism such as adhesives, brazing, and/or welding. Furthermore, the leg portion 62 at the second end 68 includes an opening 70 for receiving, for example, an arm portion of an adjustable arm portion disclosed in U.S. application Ser. No. 16/395,821.

The adjustable arm portion of U.S. application Ser. No. 16/395,821 can be attached to and/or adjustable with respect to a surgical table. When used with the arm portion of the adjustable arm portion, one of the opening 70 and the arm portion can include a key, and the other of the opening 70 and the arm portion can include a keyway. As depicted in FIG. 1, the opening 70 includes a key 72 receivable in a keyway (not shown) formed in the arm portion 64. If one of the opening 70 and the arm portion include the key 72 and the other of the opening 70 and the arm portion 64 include the keyway, the leg portion 62 would not be rotatable on the arm portion 64. If the key 72 and the keyway are not provided, the leg portion 62 could rotate on the arm portion 64. Also, a set screw (not shown) can be received in an aperture (not shown) in the base portion 60 to impinge on the arm portion 64 to maintain the position of the base portion 60 with respect to the arm portion 64.

The base portion 60, as depicted in FIG. 1, includes an opening 80 for receiving portions of the arm portion 64 therein. The opening 80 includes an interior surface 82, and the arm portion 64 is moveable upwardly and downwardly with respect to the base portion 60 via travel thereof in the opening 80. The arm portion 64 is part of the locking mechanism 12, and the locking mechanism 12 is used both for fixing the position of the arm portion 64 relative to the base portion 60, and for fixing the position of a support shaft portion 84. As discussed below, the support shaft portion 84 supports a shoulder engaging portion 86, and both the support shaft portion 84 and the shoulder engaging portion 86 are also part of the shoulder hold-down 10.

As depicted in FIG. 1, the arm portion 64 includes a first shaft portion 90, a second shaft portion 92, a cap portion 94, and a first flange portion 96. As discussed below, a second flange portion 98, a bracket portion 100, a lever-spring portion 102 having a handle portion 104 and a spring portion 106, and a collar portion 108 are attached relative to the arm portion 64.

Figure 2:
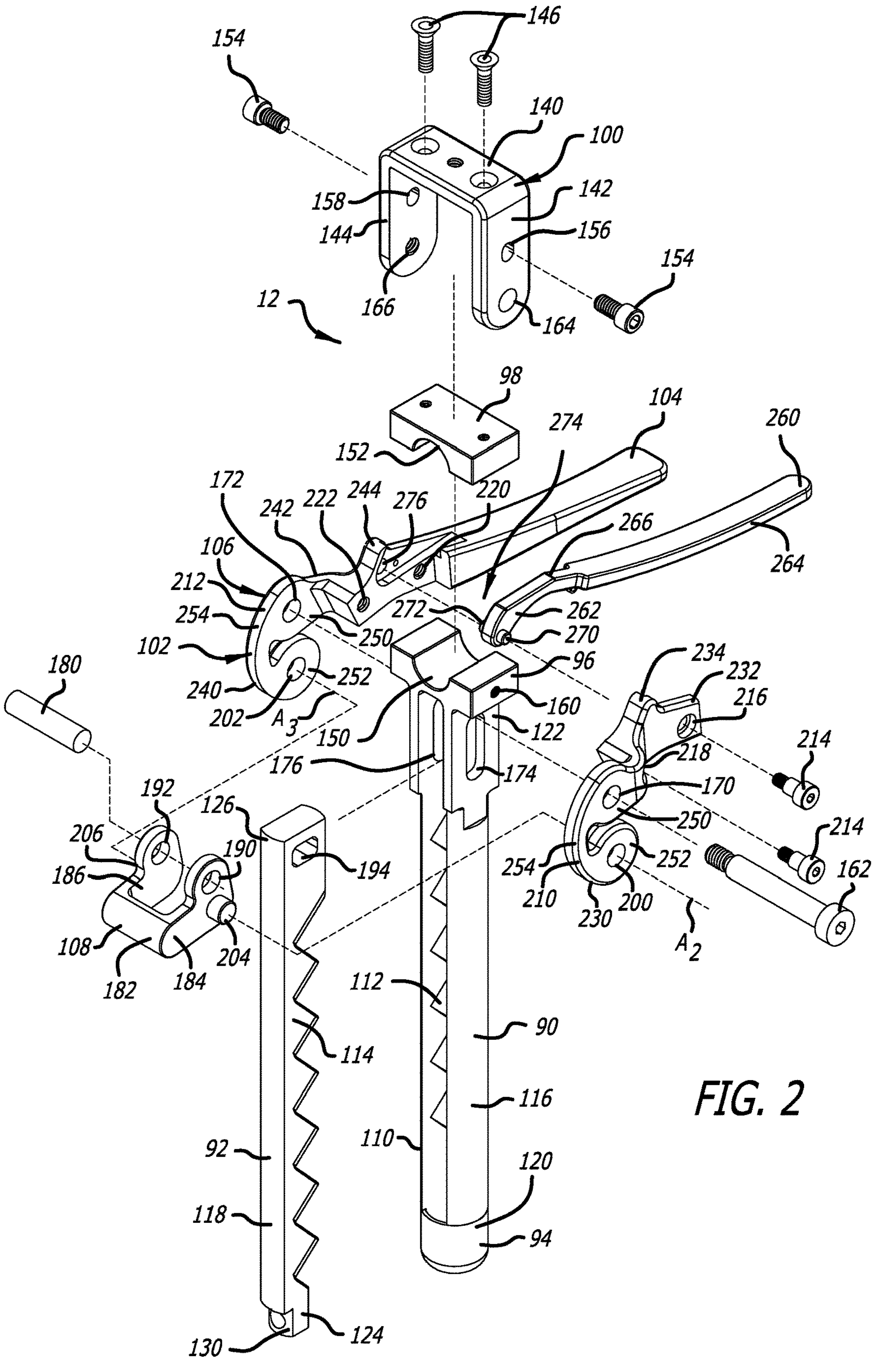
FIG. 2 is a top, side exploded view that illustrates the locking mechanism of FIG. 1.

As depicted in FIGS. 1 and 2, the first shaft portion 90 includes a channel 110 for receiving the second shaft portion 92. Furthermore, as depicted in FIG. 2, the first shaft portion 90 includes first teeth 112 formed in the channel 110, and the second shaft portion 92 includes second teeth 114 formed thereon. The first teeth 112 and the second teeth 114 are engageable to one another, and, as discussed below, movement of the second teeth 114 on the first teeth 112 causes the second shaft portion 92 to move outwardly from the channel 110. In doing so, the first shaft portion 90 and the second shaft portion 92 are expanded with respect to one another due to the contact of the first teeth 112 and the second teeth 114 sliding on each other. The first shaft portion 90 includes at least a first exterior surface 116 and the second shaft portion 92 includes at least a second exterior surface 118.

As discussed below, operation of the locking mechanism 12 causes the second shaft portion 92 to move from a retracted position within the channel 110 to a position partially out of the channel 110, and expand the first shaft portion 90 and the second shaft portion 92 with respect to one another. Thus, as the first shaft portion 90 and the second shaft portion 92 are expanded, the first exterior surface 116 and the second exterior surface 118 are pressed against portions of the interior surface 82 of the opening 80 to hold the first shaft portion 90 and the second shaft portion 92 in position relative to the base portion 60.

The first shaft portion 90 includes a first end 120 and a second end 122, and the second shaft portion 92 includes a first end 124 and a second end 126. As depicted in FIGS. 1 and 2, the first end 120 of the first shaft portion 90 and the first end 124 of the second shaft portion 92 are received in an internal cavity of the cap portion 94, and the cap portion 94 is attached to the first shaft portion 90 using a fastener 128. The first end 124 of the second shaft portion 92 includes an indentation 130 which affords movement of the second shaft portion 92 out of the channel 110.

As depicted in FIG. 2, the first flange portion 96 is fixedly attached to the first shaft portion 90 via adhesives, fasteners, brazing, and/or welding. Alternatively, the first flange portion 96 can be integrally formed with the first shaft portion 90.

The bracket portion 100 includes a body portion 140, a first leg portion 142, and a second leg portion 144, and, as depicted in FIG. 2, the second flange portion 98 is fixedly attached to the body portion 140 between the first leg portion 142 and the second leg portion 144 via fasteners 146 or other attachment mechanism such as adhesives, brazing, and/or welding. Alternatively, the second flange portion 98 can be integrally formed with the body portion 140, the first leg portion 142, and/or the second leg portion 144.

The first flange portion 96 and the second flange portion 98 include a first contact surface 150 and a second contact surface 152, respectively. Operation of the locking mechanism 12 causes clamping of the support shaft portion 84 between the first contact surface 150 and the second contact surface 152 via movement of the first flange portion 96 and the second flange portion 98 toward one another. As discussed below, such clamping holds the support shaft portion 84 in position relative to the arm portion 64.

Figure 3:
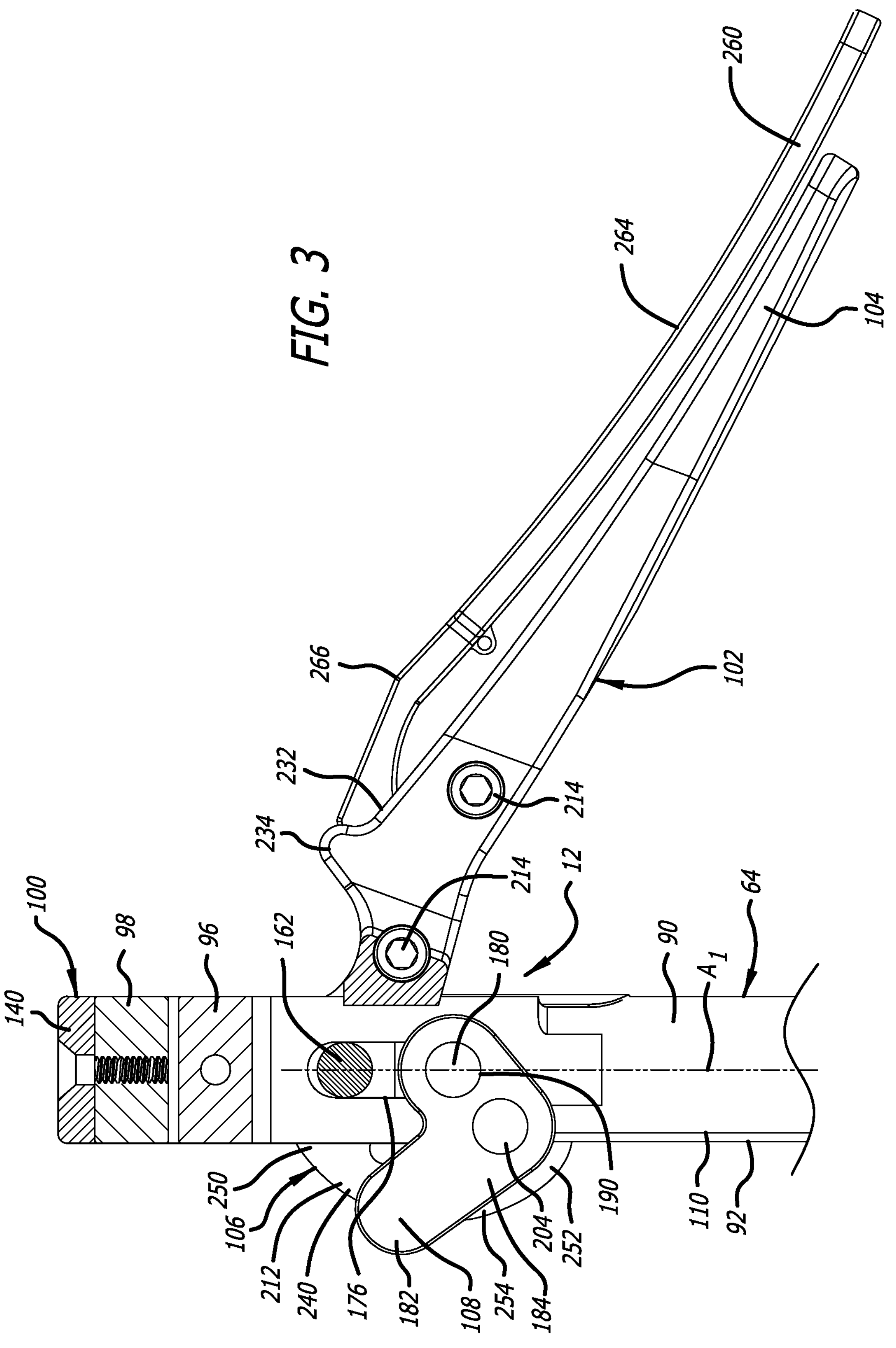
FIG. 3 is a first side cross-sectional view that illustrates the locking mechanism with a lever-spring portion thereof in a disengaged position.

Actuation of the lever-spring portion 102 from a disengaged position (FIGS. 3 and 4) to a partially engaged position (FIG. 5) to an engaged position (FIG. 6) via actuation of the handle portion 104 upwardly operates the locking mechanism 12 to cause clamping of the support shaft portion 84 between the first contact surface 150 and the second contact surface 152 to hold the support shaft portion 84 in position relative to the arm portion 64, and to cause the second shaft portion 92 to move out of the channel 110 to expand the first shaft portion 90 and the second shaft portion 92 with respect to one another to press the first exterior surface 116 and the second exterior surface 118 against portions of the interior surface 82 of the opening 80 to hold the first shaft portion 90 and the second shaft portion 92 in position relative to the base portion 60.

The first shaft portion 90 and the bracket portion 100 can be attached to one another using fasteners 154. To facilitate such attachment, the fasteners 154 are received through a first slot 156 and a second slot 158 formed in the first leg portion 142 and the second leg portion 144, respectively, and inserted into apertures 160 formed in the first flange portion 96. The fasteners 154 can be screws, and the apertures 160 can include complimentary threads to secure such attachment. As depicted in FIG. 2, the first slot 156 and the second slot 158 are vertically elongated, and as such, allows a degree of movement upwardly and downwardly of the bracket portion 100 (and the second flange portion 98) relative the first shaft portion 90 (and the first flange portion 96). As discussed below, upward actuation of the handle portion 104 of the lever-spring portion 102 ultimately forces the first flange portion 96 and the second flange portion 98 toward one another to clamp of the support shaft portion 84 between first contact surface 150 and the second contact surface 152 of the first flange portion 96 and the second flange portion 98, respectively.

The first shaft portion 90, the bracket portion 100, and the lever-spring portion 102 can be attached to one another using a fastener 162. To that end, the bracket portion 100 includes a first hole 164 and a second hole 166 formed in the first leg portion 142 and the second leg portion 144, respectively, one side of the spring portion 106 includes a first hole 170, the other side of the spring portion 106 includes a second hole 172, and the first shaft portion 90 includes a first slot 174 and a second slot 176. To facilitate such attachment, the fastener 162 is inserted in the first hole 164, then through the first hole 170, then through the first slot 174 and the second slot 176, then through the second hole 172, and then into or through the second hole 166. The fastener 162 can be a bolt, and the second hole 172 can include complimentary threads or a nut (not shown) provided to secure such attachment. As discussed below, the lever-spring portion 102 is pivotable about the fastener 162. Furthermore, as depicted in FIGS. 2-6, the first slot 174 and the second slot 176 are vertically elongated, and, as such, the first slot 174 and the second slot 176 afford a degree of vertical movement of the bracket portion 100 and the spring portion 106 relative to the first shaft portion 90. Such vertical movement ultimately affords movement of the first flange portion 96 and the second flange portion 98 toward one another upon upward actuation of the handle portion 104 to facilitate clamping of the support shaft portion 84 between the first contact surface 150 and the second contact surface 152. As discussed below, the upward actuation of the handle portion 104 forces portions of the lever-spring portion 102 against the support shaft portion 84 which correspondingly forces the first flange portion 96 and the second flange portion 98 toward one another.

Figure 4:
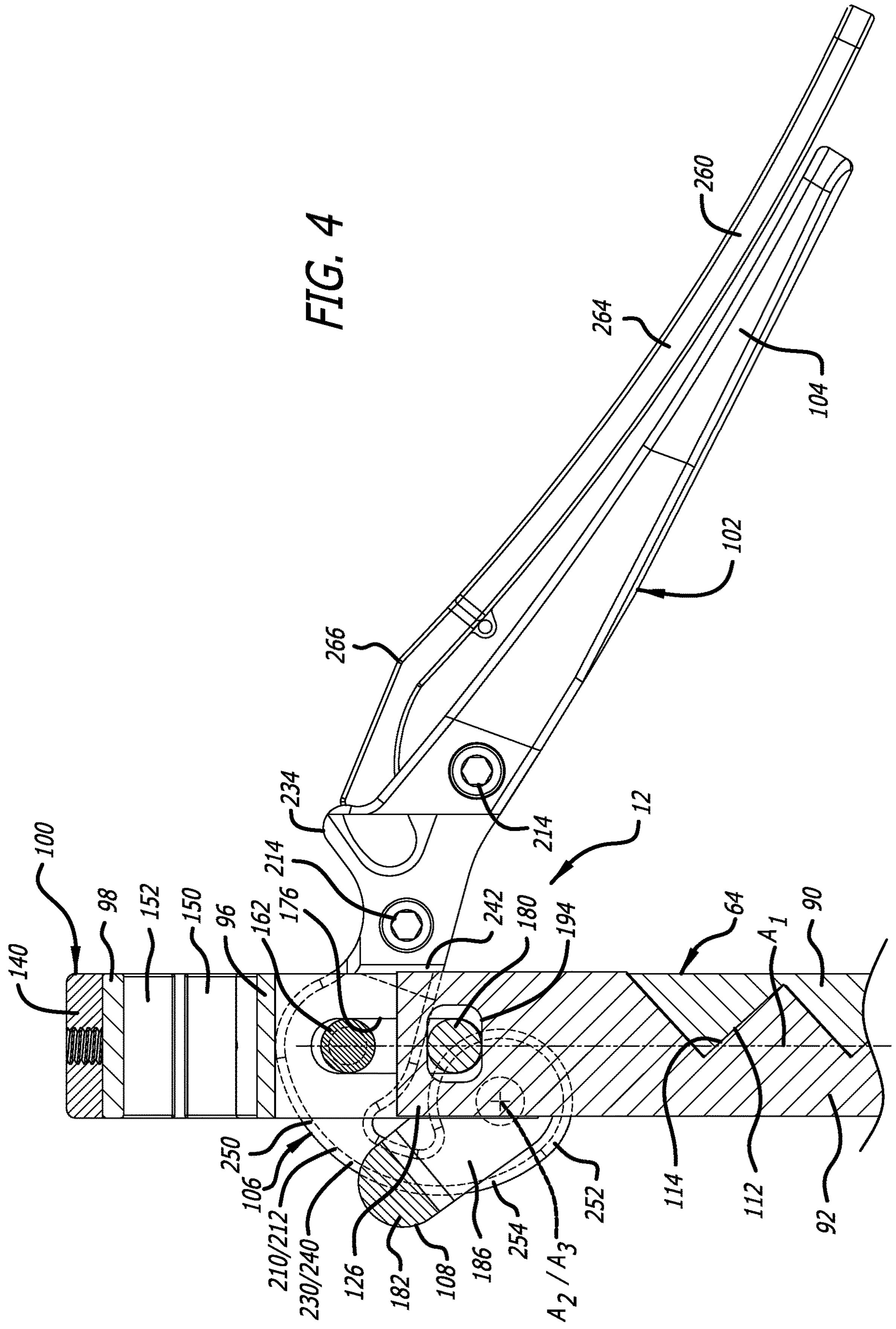
FIG. 4 is a second side cross-sectional view that illustrates the locking mechanism with the lever-spring portion thereof in the disengaged position.
Figure 5:
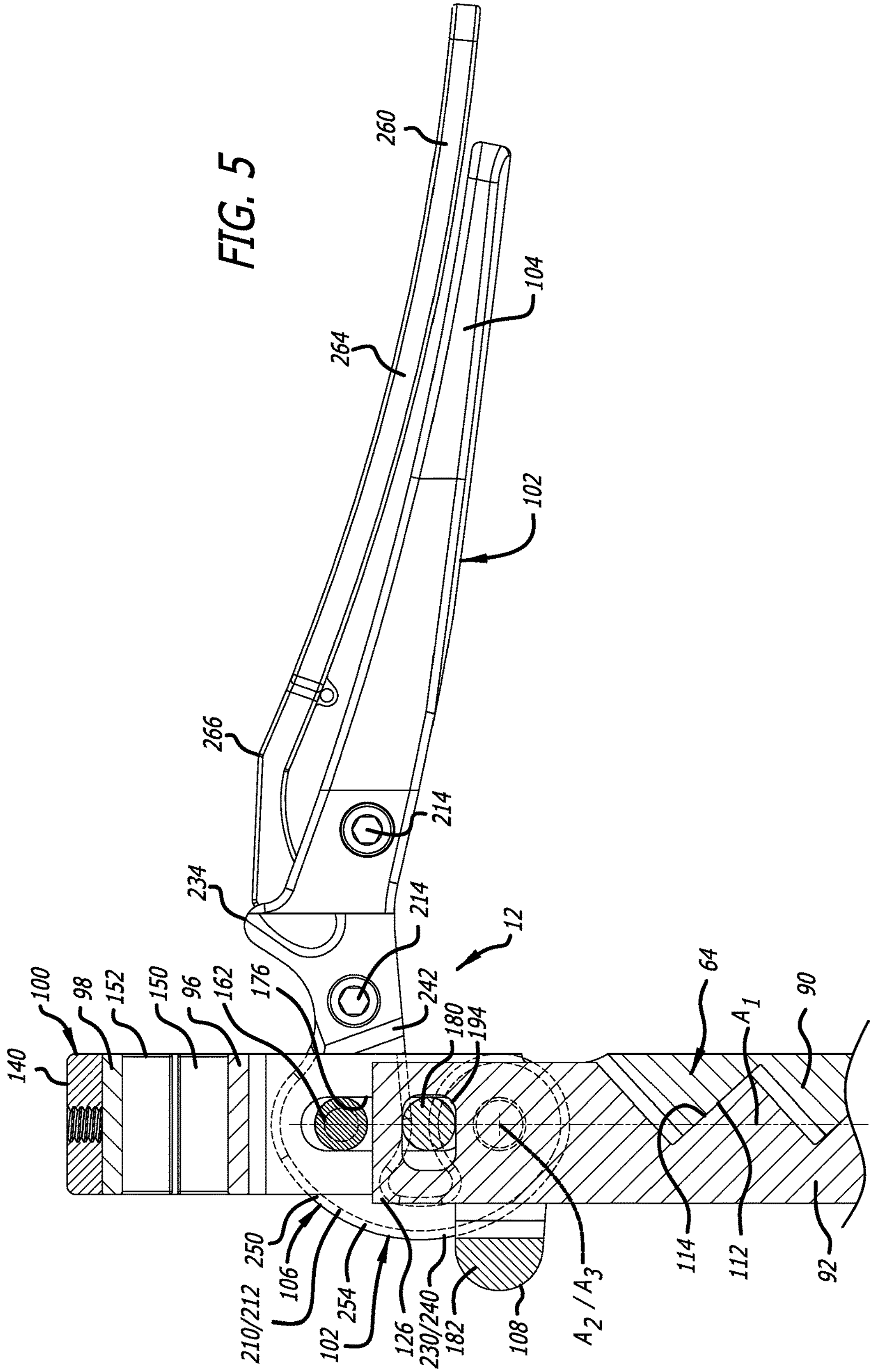
FIG. 5 is a side cross-sectional view that illustrates the locking mechanism with the lever-spring portion thereof in a partially-engaged position.
Figure 6:
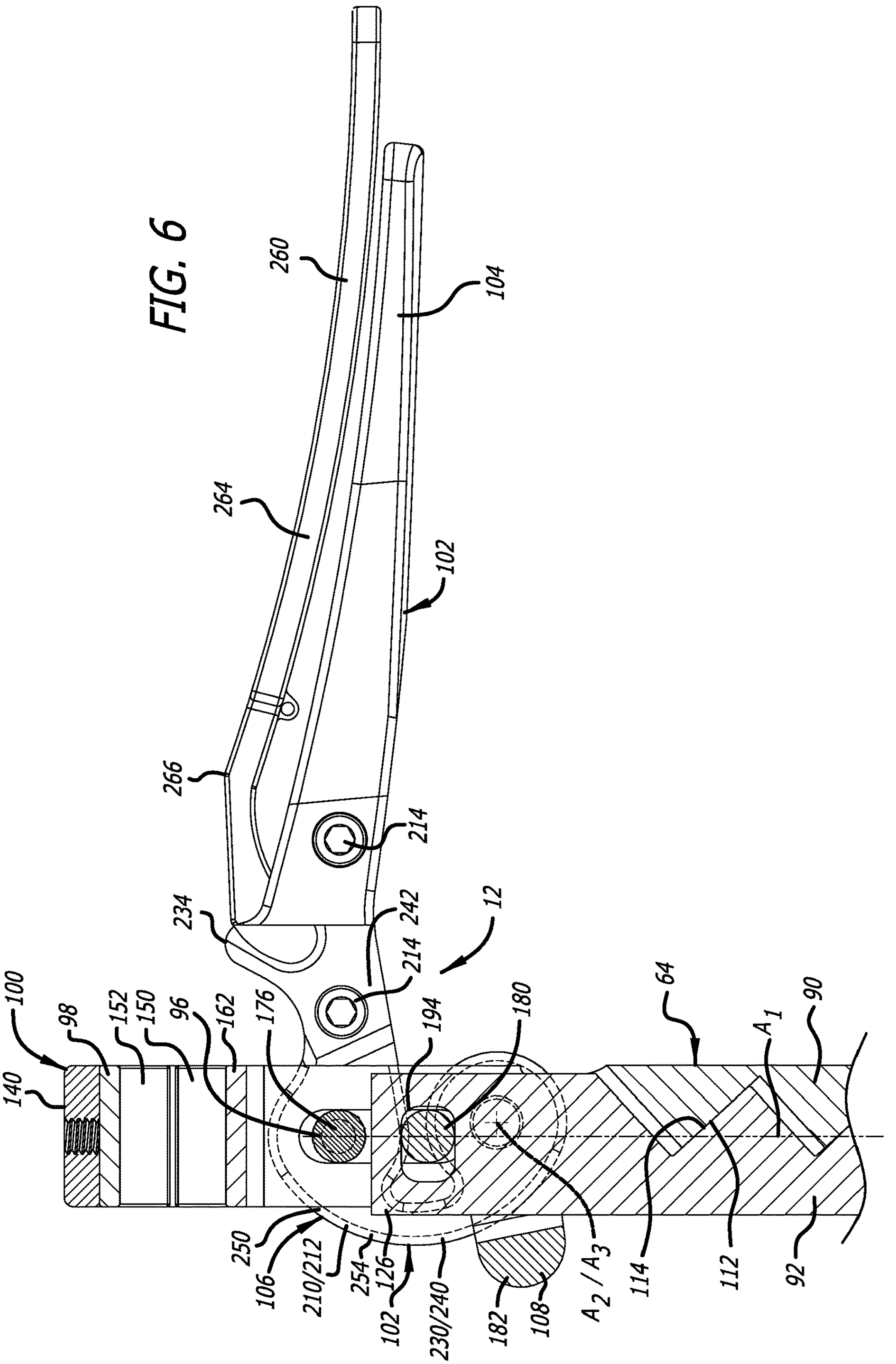
FIG. 6 is a side cross-sectional view that illustrates the locking mechanism with the lever-spring portion thereof in an engaged position.

The first shaft portion 90, the second shaft portion 92, and the collar portion 108 can be attached to one another using a dowel 180. To that end, the collar portion 108 includes a body portion 182, a first leg portion 184, a second leg portion 186, the first leg portion 184 includes a first hole 190, the second leg portion 186 includes a second hole 192. Furthermore, the second shaft portion 92 includes a slot 194. To facilitate such attachment, the dowel 180 is inserted in the first hole 190, then through the first slot 174, through the slot 194, through the second slot 176 and into the second hole 192. The dowel 180 is ultimately covered at the ends thereof by the sides of the spring portion 106 to prevent disengagement thereof from the first shaft portion 90, the second shaft portion 92, and the collar portion 108. As depicted in FIGS. 4-6, the slot 194 is horizontally elongated, and, as such, the slot 194 affords a degree of horizontal movement of the second shaft portion 92 relative to the first shaft portion 90. Such horizontal movement affords expansion of the first shaft portion 90 and the second shaft portion 92 with respect to one another upon upward actuation of the handle portion 104 to facilitate pressing of the first exterior surface 116 and the second exterior surface 118 against portions of the interior surface 82 of the opening 80.

The lever-spring portion 102 and the collar portion 108 are also attached to one another. The spring portion 106 includes a third hole 200 in one side thereof and a fourth hole 202 in the other side thereof, the first leg portion 184 of the collar portion 108 includes a first post 204, and the second leg portion 186 of the collar portion 108 includes a second post 206. To facilitate such attachment, the first post 204 is received in the third hole 200 in the spring portion 106, and the second post 206 is received in the fourth hole 202 in the spring portion 106. As discussed below, upward actuation of the handle portion 104 of the lever-spring portion 102 forces the movement of the collar portion 108 which causes movement of the dowel 180 upwardly. Upward movement of the dowel 180 forces the second shaft portion 92 upwardly, which causes expansion of the arm portion 64 due to interaction of the first teeth 112 and the second teeth 114.

The lever-spring portion 102, as discussed above, includes a handle portion 104 and a spring portion 106. The handle portion 104 facilitates actuation of the lever-spring portion 106 by a user. Furthermore, the spring portion 106 includes a first side portion 210 and a second side portion 212. As depicted in FIG. 2, the first side portion 210 can be attached to the second side portion 212, and the second side portion 212 can be integrally formed with the handle portion 104. The first side portion 210 and the second side portion 212 can be attached to one another using fasteners 214. To facilitate such attachment, the fasteners 214 are received through a first hole 216 and a second hole 218 in the first side portion 210, and respectively received in a first hole 220 and a second hole 222 in the second side portion 212. The fasteners 214 can be screws, and the first hole 216 and the second hole 218 can include complimentary threads to secure such attachment. As discussed below, the use of the first side portion 210 and the second side portion 212 affords assembly of the lever-spring portion 102 around the collar portion 108.

The first side portion 210 can include a first c-shaped portion 230 and a first transition portion 232 including a first projection 234, and the second side portion 212 can include a second c-shaped portion 240 and a second transition portion 242 including a second projection 244. Each of the first and second c-shaped portions 230 and 240 include a first lobular portion 250, a second lobular portion 252, and a leaf portion 254 extending between the first lobular portion 250 and the second lobular portion 252. As discussed below, the leaf portions 254 afford spring action of the spring portion 106 between the first lobular portions 250 and the second lobular portions 252.

The first lobular portion 250 of the first side portion 210 includes the first hole 170 formed therein, the first lobular portion 250 of the second side portion 212 includes the second hole 172 formed therein. Furthermore, the second lobular portion 252 of the first side portion 210 includes the third hole 200 formed therein, and the second lobular portion 252 of the second side portion 212 includes the fourth hole 202 formed therein. Additionally, the first transition portion 232 includes the first hole 216 and the second hole 218; and the second transition portion 242 includes the first hole 220 and the second hole 222, and connects the c-shaped portion 240 of the second side portion 212 to the handle portion 104. The first projection 234 and the second projection 244 can ultimately be contacted to the support shaft portion 84 to inhibit upward movement of the lever-spring portion 102.

By the first side portion 210 and the second side portion 212 being assembled around the collar portion 108, the first post 204 can be received in the third hole 200, and the second post 206 can be received in the fourth hole 202. The assembly of the first side portion 210 and the second side portion 212 also affords space for receiving portions of a secondary lever portion 260 therebetween. As discussed below, the secondary lever portion 260 is used in releasing the lever-spring portion 102 from the engaged position thereof.

Actuation of the handle portion upwardly facilitates actuation of the lever-spring portion 102 from the disengaged position (FIGS. 3 and 4) to the partially engaged position (FIG. 5) to the engaged position (FIG. 6), and engagement of the lever-spring portion 102 causes corresponding operation of the locking mechanism 12. The leaf portions 254, as discussed above, afford spring action between the first lobular portions 250 and the second lobular portions 252. As discussed below, this spring action ultimately serves in maintaining the lever-spring portion 102 in the engaged position, but initially resists movement of the second lobular portions 252.

Figure 7:
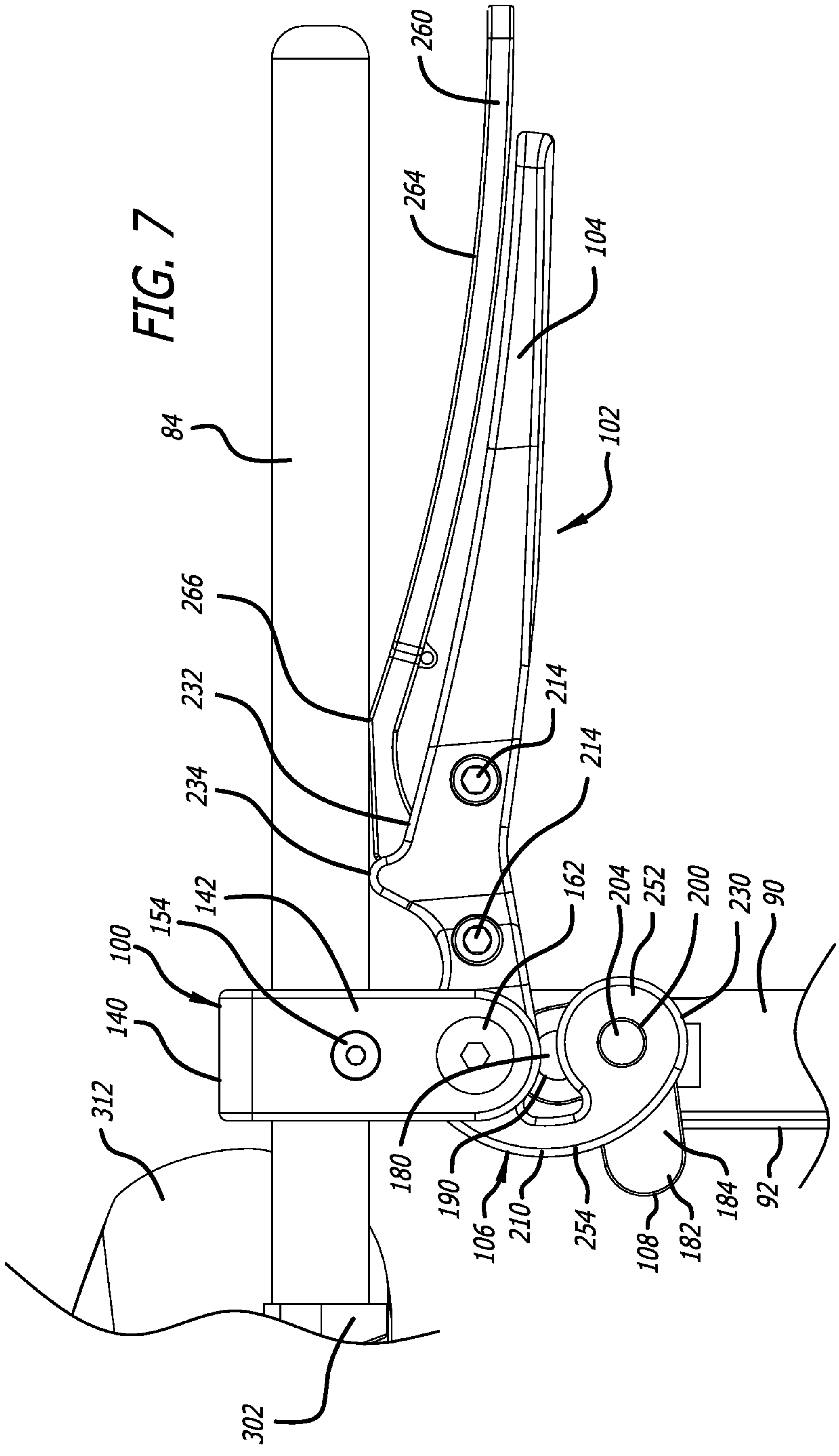
FIG. 7 is a side elevational view that illustrates the locking mechanism with a support shaft of the shoulder hold-down attached thereto and the lever-spring portion in the engaged position.

The lever-spring portion 102 pivots about the fastener 162, and, as depicted in FIGS. 4-6, upward movement of the handle portion 104 causes corresponding movement of the second lobular portions 252 of the first side portion 210 and the second side portion 212 of the spring portion 106 toward the arm portion 64. However, flexion of the leaf portions 254 of the first side portion 210 and the second side portion 212 (due to upward movement of the handle portion 104) somewhat resist such movement of the second lobular portions 252 toward the arm portion 64. Furthermore, the resistance to movement of the second lobular portions 252 toward the first arm portion 64 increases as the second lobular portions 252 approach the axis $A_1$ of the arm portion 64. Thus, the applied force necessary to move the handle portion 104 upwardly as the second lobular portions 252 approach the axis $A_1$ is relatively high. As depicted in FIG. 7, the upward movement of the handle portion 104 to actuate the lever-spring portion 102 into the engaged position ultimately positions the second lobular portions 252 such that the axis $A_2$ of the third hole 200 and the axis $A_3$ of the fourth hole 202 are moved from a first side (FIG. 4) to a second side (FIGS. 6 and 7) of the axis $A_1$ of the arm portion 64.

Moving the lever-spring portion 102 into the engaged position causes, the first projection 234 and the second projection 244 to ultimately contact the support shaft 84 to prevent further upward movement of the handle portion 104. The first projection 234 and the second projection 244 also serve as fulcrums which causes downward movement of the bracket portion 100 due to pivotal movement of the lever-spring portion 102 about the fastener 162, and the corresponding interaction of the fasteners 154 in the first slot 156 and the second slot 158. Downward movement of the bracket portion 100 causes clamping of the support shaft portion 84 between the first contact surface 150 (of the first flange portion 96) and the second contact surface 152 (of the second flange portion 98) to hold the support shaft portion 84 in position relative to the arm portion 64. Moving the lever-spring portion 102 in the engaged position also causes the second shaft portion 92 to move out of the channel 110 to expand the first shaft portion 90 and the second shaft portion 92 with respect to one another to press the first exterior surface 116 and the second exterior surface 118 against portions of the interior surface 82 of the opening 80 to hold the first shaft portion 90 and the second shaft portion 92 in position relative to the base portion 60. As such, the locking mechanism 12 serves to lock the support shaft portion 84 in position, and also to lock the arm portion 64 in position. Thus, the locking mechanism 12 serves as a double-lock.

The spring force of the leaf portions 254 also maintains the lever-spring portion 102 in the engaged position. After the second lobular portions 252 are positioned such that, as depicted in FIGS. 6 and 7, the axis $A_2$ of the third hole 200 and the axis $A_3$ of the fourth hole 202 are positioned on the second side of the axis $A_1$ of the arm portion 64 flexion of leaf portions 254 of the first side portion 210 and the second side portion 212 (due to downward movement of the handle portion 104) resist return movement of the second lobular portions 252. That is, the flexion of the leaf portions 254 (due to downward movement of the handle portion 104) resists movement of the second lobular portions 252 to provide the second lobular portions 252 with a tendency to remain in position with the lever-spring portion 102 in the engaged position.

Because of the tendency of the second lobular portions 252 to remain in position due to the flexion of the leaf portions 254, the applied force necessary to move the handle portion 104 downwardly is relatively high. Thus, the secondary lever portion 260 is provided to overcome the flexion of the leaf portion 254 to facilitate downward movement of the handle portion 104 of the lever-spring portion 102. The secondary lever portion 260 includes a first portion 262 facilitating pivotal attachment to the lever-spring portion 102, a second portion 264 that serves as a handle, and a fulcrum 266 at the transition between the first portion 262 and the second portion 264. The first portion 262 includes a first post 270 and a second post 272 formed thereon for receipt in portions of the lever-spring portion 102.

As depicted in FIG. 2, the first side portion 210 and the second side portion 212 define a gap 274 for receiving a portion of the first portion 262 therebetween, the first side portion 210 includes an aperture (not shown) for receiving the first post 270, and the second side portion 212 includes an aperture 276 for receiving the second post 272. When the first post 270 and the second post 272 are positioned relative the first side portion 210 and the second side portion 212, the secondary lever portion 260 is pivotally attached with respect to the lever-spring portion 102.

Figure 8:
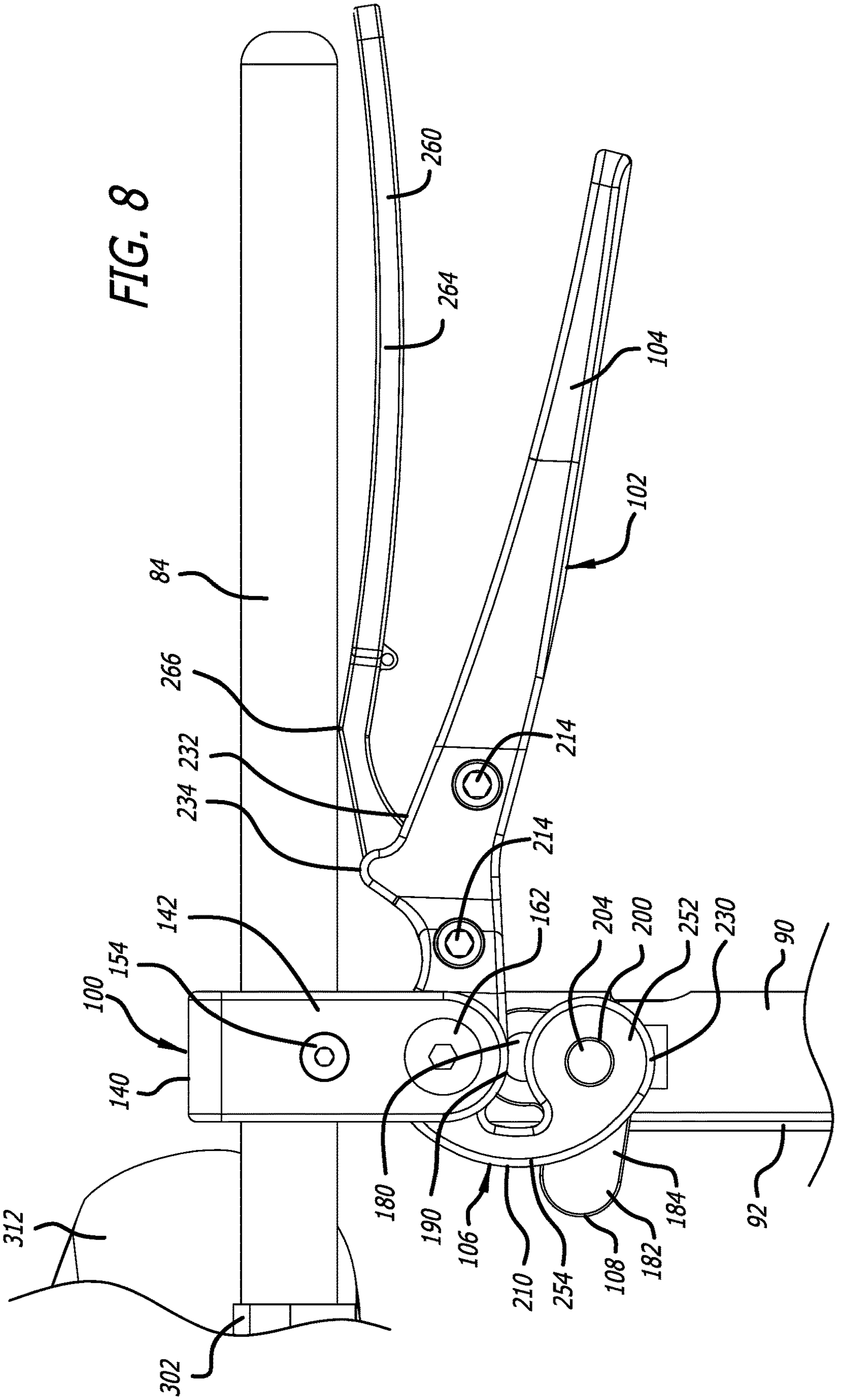
FIG. 8 is a side elevational view that illustrates the locking mechanism with the support shaft of the shoulder hold-down attached thereto and the lever-spring portion in a partially-disengaged position.
Figure 9:
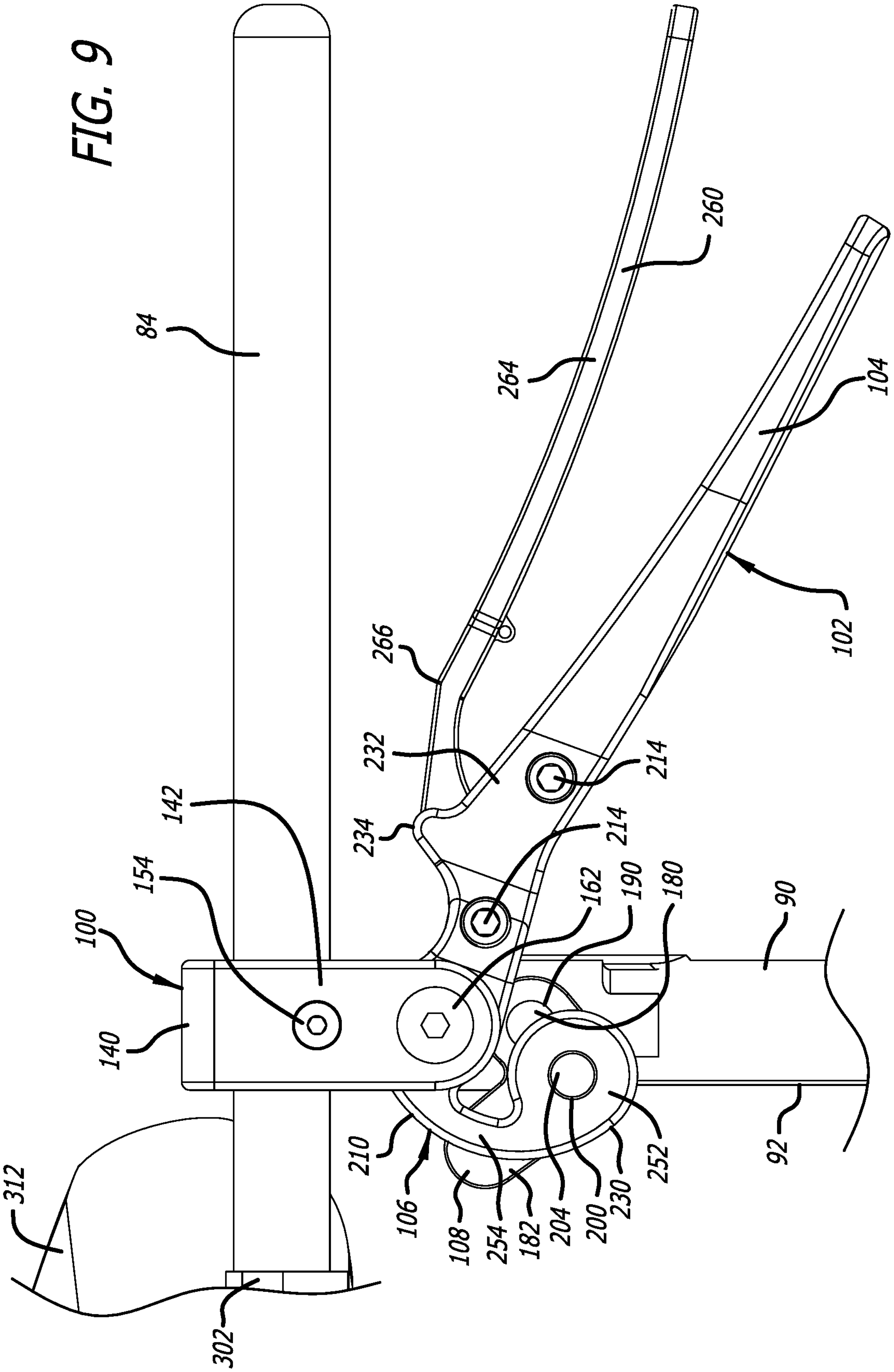
FIG. 9 is a side elevational view that illustrates the locking mechanism with the support shaft of the shoulder hold-down attached thereto and the lever-spring portion in another partially-disengaged position.

The pivotal attachment of the secondary lever portion 260 to the lever-spring portion 102 allows the second portion 264 to be moved upwardly to facilitate, as depicted in FIG. 8, forceful contact of the fulcrum 266 with the support shaft portion 84. Contact of the fulcrum 266 with the support shaft portion 84 forces the handle portion 104 of the lever-spring portion 102 downwardly (FIG. 8) by overcoming the spring action of the leaf portions 254 to move the second lobular portions 252 to the first side of the axis $A_1$ of the arm portion 64 (FIG. 9). As such, use of the secondary lever portion 260 overcomes the tendency of the second lobular portions 252 to remain in position, and facilitates downward movement of the handle portion 104 to facilitate actuation of the lever-spring portion 102 from the engaged position to the disengaged position. After use of the secondary lever 260, the applied force necessary to move the handle portion 104 downwardly is relatively low.

Moving the lever-spring portion 102 into the disengaged position, as depicted in FIG. 9, causes release of the support shaft portion 84 between the first contact surface 150 and the second contact surface 152, and causes the second shaft portion 92 to move into the channel 110 to contact the first shaft portion 90 and the second shaft portion 92 with respect to one another to release the arm portion 64 from the interior surface 82.

As discussed above, the support shaft 84 supports a shoulder engaging portion 86. The arm portion 64 can thus be moved with respect to the base portion 60, when not held in position via contact the first exterior surface 116 and the second exterior surface 118 against portions of the interior surface 82. Such movement affords two (2) modes of adjustment including slidable vertical movement and axial rotation of the arm portion 64 within the opening 80. Thus, via operation of the locking mechanism 12, the shoulder engaging portion 86 supported by the arm portion 64 (via the locking mechanism 12 and the support shaft 84) is moveable upwardly and downwardly with respect to the patient P, and also rotatable with respect to the patient P.

Additionally, the support shaft 84 can be moved with respect to the locking mechanism 12, when not held in position via contact with the first contact surface 150 and the second contact surface 152. Such movement affords two (2) modes of adjustment including slidable horizontal movement and axial rotation of the support shaft 84 between the first contact surface 150 and the second contact surface 152. Thus, via operation of the locking mechanism 12, the shoulder engaging portion 86 supported by the support shaft 84 is moveable inwardly and outwardly with respect to the patient P, and also rotatable with respect to the patient P.

An additional mode of adjustment of the shoulder engaging portion 86 is afforded by a pivot bracket 300. The pivot bracket 300, as depicted in FIG. 1, includes a first portion 302, a second portion 304, a pivotal connection 306 between the first portion 302 and the second portion 304, and a knob portion 308. The first portion 302 is attached to the support shaft 84, and the second portion 304 is attached to the shoulder engaging portion 86. The pivotal connection 306 affords pivotal movement between the first portion 302 and the second portion 304, and hence, affords pivotal movement of the shoulder engaging portion 86 relative to the support shaft 84. As such, in addition to the adjustment afforded by movement of the arm portion 64 and the support shaft 84, the pivot bracket 300 affords pivotal movement of the shoulder engaging portion 86.

The shoulder engaging portion 86 includes an attachment bracket 310 and a shoulder contacting structure 312. The attachment bracket 310 is attached to the second portion 304 of the pivot bracket 300, and supports the shoulder contacting structure 312 relative to the pivot bracket 300. The attachment bracket 310 can be integrally formed with the second portion 304 of the pivot bracket 300, or can be attached to the second portion 304 via fasteners (not shown) or other attachment mechanism such as adhesives, brazing, and/or welding.

The shoulder contacting structure 312 includes a first portion 314 and a second portion 316. As depicted in FIG. 1, the curvatures of the first portion 314 and the second portion 316 are provided to conform to the typical shape and size of a patient's shoulder and back, respectively. To that end, the first portion 314 has a relatively large curvature such that the first portion 314 curves upwardly and extends away from the attachment bracket 310, and the second portion 316 has a relatively small curvature such that the second portion 316 is slightly curved and extends outwardly from the first portion 314.

The second portion 316 can include an aperture 320 therethrough for receiving straps (not shown) extending between a first one and/or a second one of shoulder hold-downs 10 and the surgical frame. The straps can also be received through and extend between the apertures 320 of the first one and the second one of the shoulder hold downs 10. In doing so, the straps can be used in securing the torso of the patient P to the surgical frame.

Use of the first one and the second one of the shoulder hold-downs 10 serve to contact the right shoulder and the left shoulder, respectively, and portions of the patient's back can be used to aid in securing the position of the patient P relative to a main beam (not shown) of the surgical frame. The modes of adjustment afford manipulation of the hold-downs 10 to facilitate positioning of the shoulder engaging portions 86 relative to the patient supported on the main beam. The positioning of the shoulder hold-downs 10 also is aided by movement thereof along the adjustable arm portions attached relative to the surgical frame. When the shoulder hold-downs 10 are used with the other componentry for supporting portions of the patient P relative to the main beam, the main beam can be rotated to position and reposition the patient P for surgery.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

The invention claimed is:

1. A locking mechanism comprising:

an arm portion including a first shaft portion and a second shaft portion, the arm portion including a first end, an opposite second end, and a mid-longitudinal axis extending through the first end and the second end, the second shaft portion being expandable and contractable relative to the first shaft portion, the first shaft portion adjacent the first end of the arm portion including at least a first aperture, and the second shaft portion adjacent the first end of the arm portion including a second aperture;

a lever-spring portion having a handle portion and a spring portion, the spring portion including at least a first side portion having a third aperture and a fourth aperture formed thereon;

a collar portion having a first post portion and a fifth aperture, end portions of each of the first shaft portion and the second shaft portion adjacent the first end of the arm portion being positioned adjacent the the collar portion;

one of a first rod and a first fastener extending through the first aperture and the third aperture to attach the first shaft portion of the arm portion and the lever-spring portion, one of a second rod and a second fastener extending through the first aperture, the second aperture, and the fifth aperture to attach the first shaft portion of the arm portion, the second shaft portion of the arm portion, and the collar portion to one another, and the first post portion being received in the fourth aperture to attach the spring portion and the collar portion to one another;

wherein movement of the handle portion from an unactuated position to an actuated position pivots the first side portion of the spring and moves the one of the second rod and the second fastener to correspondingly cause expansion of the second shaft portion relative to the first shaft portion.

2. The locking mechanism of claim 1, wherein movement of the handle portion to the actuated position causes pivotal movement of the first side portion of the spring portion about the one of the first rod and the first fastener, and causes corresponding movement of the first post portion toward the mid-longitudinal axis of the arm portion that causes movement of the one of the second rod and the second fastener toward the one of the first rod and the first fastener to correspondingly expand the second shaft portion relative to the first shaft portion.

3. The locking mechanism of claim 1 used as part of a shoulder hold-down for use in securing at least a shoulder of a patient in position relative to a surgical frame, the shoulder hold-down comprising the locking mechanism, a support shaft portion, a shoulder engaging portion, and a base portion, the support shaft portion being attached relative to the locking mechanism and the shoulder engaging portion being attached relative to the support shaft portion, the shoulder engaging portion including a shoulder contacting structure configured to contact at least the shoulder of the patient, and the base portion being attached relative to the surgical frame, and including an aperture extending therethrough, the aperture of the base portion including an interior surface and being configured to receive portions of the first shaft portion and the second shaft portion therein.

4. The shoulder hold-down of claim 3, wherein expansion of the first shaft portion and the second shaft portion relative to one another causes impingement of a first exterior surface of the first shaft portion and a second exterior surface of the second shaft portion against the interior surface of the aperture in the base portion to hold the arm portion in position relative to the base portion.

5. The shoulder hold-down of claim 4, wherein, when the handle portion is unactuated, the first shaft portion and the second shaft portion are unexpanded with respect to one another, and the first shaft portion and the second shaft portion are capable of linear and rotational movement in the aperture formed in the base portion.

6. The shoulder hold-down of claim 3, wherein the shoulder engaging portion further comprises a pivot connection positioned between the shoulder contacting structure and the support shaft, the pivot connection facilitating pivotal movement of the shoulder engaging portion relative to the support shaft.

7. The shoulder hold-down of claim 1, wherein the first side portion of the spring portion includes a first lobular portion, a second lobular portion, and a leaf portion connecting the first lobular portion and the second lobular portion, the first lobular portion of the first side portion including the third aperture formed therein, the second lobular portion of the first side portion including the fourth aperture formed therein, wherein movement of the handle portion from the actuated position to the unactuated position is resisted by flexion of the leaf portion of the first side portion of the spring portion.

8. The shoulder hold-down of claim 7, wherein the flexion of the leaf portion of the first side portion initially resists movement of the handle portion from the unactuated position to the actuated position.

9. A locking mechanism comprising:

an arm portion including a first shaft portion and a second shaft portion, the arm portion including a first end, an opposite second end, and a mid-longitudinal axis extending through the first end and the second end, the second shaft portion being expandable and contractable relative to the first shaft portion, the first shaft portion adjacent the first end of the arm portion including at least a first aperture, and the second shaft portion adjacent the first end of the arm portion including a second aperture;

a lever-spring portion having a handle portion, a spring portion, and a collar portion, the spring portion including at least a first side portion having a third aperture and a fourth aperture formed thereon, the collar portion having a first post portion and a fifth aperture, end portions of each of the first shaft portion and the second shaft portion adjacent the first end of the arm portion being positioned adjacent the collar portion; and one of a first rod and a first fastener extending through the first aperture and the third aperture to attach the first shaft portion of the arm portion and the lever-spring portion, one of a second rod and a second fastener extending through the first aperture, the second aperture, and the fifth aperture to attach the first shaft portion of the arm portion, the second shaft portion of the arm portion, and the collar portion to one another, and the first post portion being received in the fourth aperture to attach the spring portion and the collar portion to one another;

wherein movement of the handle portion from an unactuated position to an actuated position causes expansion of the second shaft portion relative to the first shaft portion via pivotal movement of the first side portion of the spring portion and movement of the one of the second rod and the second fastener.

10. The locking mechanism of claim 9, wherein movement of the handle portion to the actuated position causes pivotal movement of the first side portion of the spring portion about the one of the first rod and the first fastener, and causes corresponding movement of the first post portion toward the mid-longitudinal axis of the arm portion that causes movement of the one of the second rod and the second fastener toward the one of the first rod and the first fastener to correspondingly expand the second shaft portion relative to the first shaft portion.

11. The locking mechanism of claim 9 used as part of a shoulder hold-down for use in securing at least a shoulder of a patient in position relative to a surgical frame, the shoulder hold-down comprising the locking mechanism, a shoulder engaging portion, and a base portion, the shoulder engaging portion being attached relative to the arm portion, and including a shoulder contacting structure configured to contact at least the shoulder of the patient, and the base portion being attached relative to the surgical frame, and including an aperture extending therethrough, the aperture of the base portion including an interior surface and being configured to receive portions of the first shaft portion and the second shaft portion therein.

12. The shoulder hold-down of claim 11, wherein expansion of the first shaft portion and the second shaft portion relative to one another causes impingement of a first exterior surface of the first shaft portion and a second exterior surface of the second shaft portion against the interior surface of the aperture in the base portion to hold the arm portion in position relative to the base portion.

13. The shoulder hold-down of claim 12, wherein, when the handle portion is unactuated, the first shaft portion and the second shaft portion are unexpanded with respect to one another, and the first shaft portion and the second shaft portion are capable of linear and rotational movement in the aperture formed in the base portion.

14. The shoulder hold-down of claim 9, wherein of the first side portion of the spring portion includes a first lobular portion, a second lobular portion, and a leaf portion connecting the first lobular portion and the second lobular portion, the first lobular portion of the first side portion including the third aperture formed therein, and the second lobular portion of the first side portion including the fourth aperture formed therein, wherein movement of the handle portion from the actuated position to the unactuated position is resisted by flexion of the leaf portion of the first side portion of the spring portion.

15. The shoulder hold-down of claim 14, wherein the flexion of the leaf portion of the first side portion initially resists movement of the handle portion from the unactuated position to the actuated position.

16. A locking mechanism, the locking mechanism comprising:

an arm portion including a first shaft portion and a second shaft portion, the arm portion including a first end, an opposite second end, and a mid-longitudinal axis extending through the first end and the second end, the first shaft portion adjacent the first end of the arm portion including at least a first aperture, and the second shaft portion adjacent the first end of the arm portion including a second aperture;

a lever-spring portion having a handle portion and a spring portion, the spring portion including at least a first side portion having a third aperture and a fourth aperture formed thereon, a collar portion including a first post portion and a fifth aperture; and one of a first rod and a first fastener extending through the first aperture, and the third aperture to attach the first shaft portion of the arm portion and the lever-spring portion, one of a second rod and a second fastener extending through the first aperture, the second aperture, and the fifth aperture to attach the first shaft portion of the arm portion, the second shaft portion of the arm portion, and the collar portion to one another, and the first post portion being received in the fourth aperture to attach the spring portion and the collar portion to one another;

wherein movement of the one of the second rod and the second fastener toward the one of the first rod and the first fastener via movement of the handle portion from an unactuated position to an actuated position causes the second shaft portion to expand relative to the first shaft portion; and wherein return movement of the handle portion from the actuated position to the unactuated position is resisted by flexion of portions of the spring portion.

17. The locking mechanism of claim 16 used as part of a shoulder hold-down for use in securing at least a shoulder of a patient in position relative to a surgical frame, the shoulder hold-down comprising the locking mechanism, a shoulder engaging portion, and a base portion, the shoulder engaging portion being attached relative to the arm portion, and including a shoulder contacting structure configured to contact at least the shoulder of the patient, and the base portion being attached relative to the surgical frame, and including an aperture extending therethrough, the aperture of the base portion including an interior surface and being configured to receive portions of the first shaft portion and the second shaft portion therein.

18. The shoulder hold-down of claim 16, wherein expansion of the first shaft portion and the second shaft portion relative to one another causes impingement of a first exterior surface of the first shaft portion and a second exterior surface of the second shaft portion against the interior surface of the aperture in the base portion to hold the arm portion in position relative to the base portion.

19. The shoulder hold-down of claim 18, wherein, when the handle portion is unactuated, the first shaft portion and the second shaft portion are unexpanded with respect to one another, and the first shaft portion and the second shaft portion are capable of linear and rotational movement in the aperture formed in the base portion.

20. The shoulder hold-down of claim 16, wherein the first side portion of the spring portion includes a first lobular portion, a second lobular portion, and a leaf portion connecting the first lobular portion and the second lobular portion, the first lobular portion of the first side portion including the third aperture formed therein, and the second lobular portion of the first side portion including the fourth aperture formed therein, wherein the flexion of the leaf portion of the first side portion initially resists movement of the handle portion from the unactuated position to the actuated position.

* * * * *